United States Patent [19]

Harney

[11] 4,352,105
[45] Sep. 28, 1982

[54] DISPLAY SYSTEM

[75] Inventor: Robert C. Harney, Acton, Mass.

[73] Assignee: Radiation Dynamics, Inc., Melville, N.Y.

[21] Appl. No.: 78,793

[22] Filed: Sep. 25, 1979

[51] Int. Cl.³ .............................................. G01S 7/06
[52] U.S. Cl. ................................ 343/5 CD; 340/703; 340/715; 340/747
[58] Field of Search ............ 343/5 CD; 340/701, 703, 340/715, 793, 747

[56] References Cited
U.S. PATENT DOCUMENTS 3,614,720 10/1971 Ludlum ....................... 343/5 CD X
3,711,822 1/1973 Muller .......................... 343/5 CD X
3,961,306 6/1976 Anstey ......................... 343/5 CD X
4,071,843 1/1978 Marien ............................. 343/5 CD
4,169,285 9/1979 Walker .

Primary Examiner—T. H. Tubbesing
Attorney, Agent, or Firm—Howard L. Rose

[57] ABSTRACT

A system for displaying two functions of two variables. In one form, for displaying range and intensity functions for active infrared radar images, the system maps range information into hues, and intensity information into different apparent brightness levels for each of the various hues and generates corresponding control signals for a color display.

6 Claims, 2 Drawing Figures

DISPLAY SYSTEM

The Government has rights in this invention pursuant to Contract Number AF19628-78-C-0002 awarded by the U.S. Department of the Air Force.

REFERENCE TO RELATED APPLICATION

This application is related to my U.S. Patent application Ser. No. 078,791, entitled Infrared Radar System, filed on even date herewith. That application is incorporated by reference herein.

BACKGROUND OF THE DISCLOSURE

Recent technology advances, specifically in the areas of $CO_2$ laser and 10.6 micrometer (um) heterodyne detection, have prompted the development of compact imaging infrared radar systems, such as disclosed by the patent application incorporated by reference herein. The unique capability of infrared radar systems to provide high resolution, bad weather penetration, and day-night operation, make such system applicable to terrain avoidance, obstacle avoidance, and bad weather landing. Unlike conventional microwave radar, an infrared radar can provide simultaneous range, intensity, and high resolution angular information. Conventional two dimensional image processing techniques do not simultaneously display that available information.

SUMMARY OF THE INVENTION

The present invention incorporates a two function color mapping technique which utilizes the ability of the human visual system to perceive color. It is well known fact the eye's sensitivity to changes in color far exceeds its sensitivity to changes in grey scale. In addition, the visual color response is quasi-orthognal with respect to hue and apparent brightness.

In one form of the invention range and intensity information from an infrared radar is transformed to provide color mapped image control signals for a color display. The resultant display imparts a distinct three-dimensional quality to the imagery. This is accomplished by linearly mapping the range information into a small number of "range bins", where each range bin is associated with a distinct hue on the display device. The process is completed by mapping the corresponding intensity information above a threshold into a small number of intensity bins matched in number to the brightness levels of each hue. Table I contains an example of an exemplary range-intensity color mapping designed for an infrared radar with 4 bits dynamic range.

TABLE I
Exemplary Range/Intensity Color Mapping

| Intensity (I) | Range (R) 0-5 | Range (R) 6-10 | Range (R) 11-15 | Mapped Intensity (I') |
|---|---|---|---|---|
| 0 | Black | Bloack | Black | 0 |
| 1-5 | Dark Red | Dark Green | Dark Blue | 1 |
| 6-10 | Red | Green | Blue | 2 |
| 11-15 | Light Red | Light Green | Light Blue | 3 |
| | 1 | 2 | 3 | |
| | | Mapped Range (R') | | |

This table contains the color that would be displayed given a picture element intensity, I(i, j), and range R(i, j). I' and R' correspond to the range/intensity color mapping axes.

With this configuration, adjacent pixels of equal intensity are displayed by visually distinct hues based on their corresponding range value. Small weak scatters visually masked in intensity by larger objects behind them in the image plane are made visually distinct using range/intensity color mapping.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
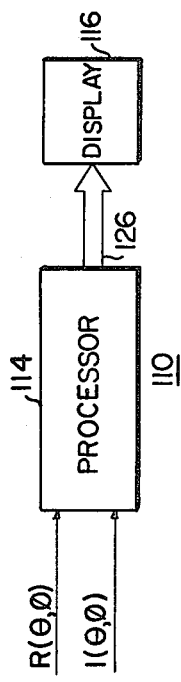
FIG. 1 shows in block diagram form an exemplary embodiment of the present invention.
Figure 2:
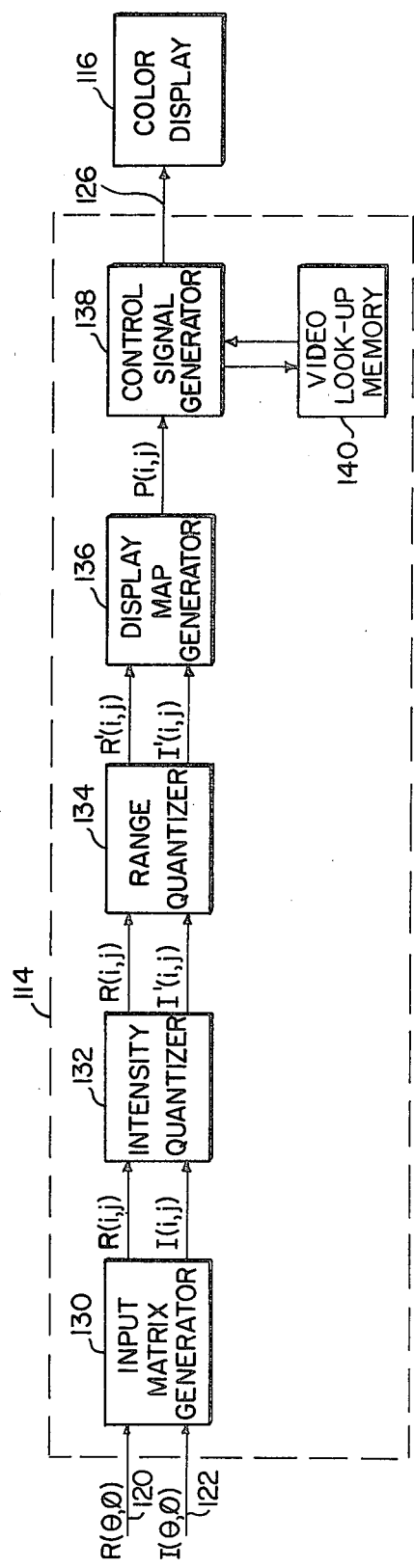
FIG. 2 shows in detailed block diagram form, the embodiment of FIG. 1.

FIGS. 1 and 2 show display system 110 in accordance with the present invention. The system 110 is particularly adapted for use with an infrared radar system such as that disclosed in the incorporated reference. The system 110 includes a processor 114 and a conventional color display 116. Processor 114 is adapted to receive range information $R(\theta, \phi)$ on line 120 and intensity information $I(\theta, \phi)$ on line 122. The range information is representative of the range of objects as a function of the angular coordinates $\theta$ and $\phi$ of pixels in a target scene. The intensity information is representative of the intensity of reflections from objects as a function of $\theta$ and $\phi$ in the target scene. Processor 114 provides control signals for display 116 by way of signal path 126.

In this embodiment, the system 110 produces a 128 by 128 picture element (pixel) digital image with a 12 mrad×12 mrad field-of-view. Each pixel in the image has a digital intensity value between 0 and 255 counts. The 128 by 128 range matrix contains the range increment beyond the start of a variable range gate. Each digital count corresponds to a range increment of 9 m, thereby providing a maximum range gate width of 2.3 km. Range and intensity data may be recorded on digital tape for off-line image processing.

Processor 114 produces the control signals to display 116 in the following manner. First, input matrix generator 130 generates an image range matrix R(i,j) and an image intensity matrix I(i,j) where i,j denote the i, jth pixels, $1 \leq i \leq 128$, and $1 \leq j \leq 128$. Intensity quantizer 132 then generates a global histogram (frequency of occurrence vs. intensity digital value) for the data in the image intensity matrix I(i,j). Quantizer 132 calculates the mode M and standard deviation S of this histogram uses those values to define an empirically derived threshold intensity value $$T = M + KS \quad (1)$$

where $0.1 \leq K \leq 0.25$.

Quantizer 132 then uses the cumulative distribution function of the histogram (i.e., the probability that the intensity of an arbitrary pixel is less than or equal to a given value), to map pixels with an intensity in excess of threshold into a small number N equiprobable bins. Pixels whose intensity does not exceed the threshodl are considered as noise and mapped into a zero intensity bin. The end result of these operations is a new image intensity matrix I'(i,j) having the same dimension as $I(i,j)$ but where the dynamic range of samples of $I'$ is defined as $$0 \leq (I' = \text{integer}) \leq N \quad (2)$$

The intensity mapping is therefore $$I'(i,j) = \begin{cases} n, & \text{if } I(i,j) > T \text{ for } 1 \leq n \leq N \\ 0, & \text{otherwise} \end{cases} \quad (3)$$
$$\text{for } 1 \leq i \leq x$$
$$1 \leq j \leq y$$

for an image having x rows and y columns.

Most intensity values attributed to noise have a low intensity value and therefore occupy the lower end of the global histogram. Consequently, only those points most likely to be true signal are enhanced.

The intensity thresholding described above is required when the infrared radar recording system includes a digital peak detector which determines the value of the highest intensity occurring within the range gate and the apparent range of that highest intensity for each pixel regardless of whether the highest intensity is due to a true target return or system noise. Without thresholding, low-intensity areas of an image would contain many noise points of random hues (noise spikes occur at random times and therefore at random apparent ranges). This degrades edge definition and overall image quality. The threshold defined by Eq. (1) is obtained by examining the effects of varying the threshold on a variety of images.

Range quantizer 134 then analyzes the image range matrix $R(i,j)$ by initially determining the maximum $R_{MAX}$ and minimum $R_{MIN}$ digital range values for which there are pixels with nonzero $I'$ values. Next, quantizer 134 linearly maps the range data into a small number (H) of new range bins. That is, for each pixel a new range value $R'(i,j)$ is calculated according to the relation $$R'(i,j) = \begin{cases} \text{integer part } [H(R(i,j) - R_{MIN})/(R_{MAX} - R_{MIN}) + 1], & \text{for } R_{MIN} \leq R(i,j) \leq R_{MAX} \\ H & \text{for } R(i,j) = R_{MAX} \end{cases} \quad (4)$$
$$\text{for } 1 \leq i \leq x$$
$$1 \leq j \leq y$$

so that the dynamic range of $R'$ is $$1 \leq (R' = \text{integer}) \leq H. \quad (5)$$

The value H equals the number of hues to be used for displaying the range/intensity color mapped image.

Finally, display map generator 136 calculates a display value matrix $P(i,j)$ according to the relation $$P(i,j) = \begin{cases} 0, & \text{if } I'(i,j) = 0 \\ I'(i,j) + [R'(i,j) - 1]N, & \text{otherwise} \end{cases} \quad (6)$$
$$\text{for } 1 \leq i \leq x$$
$$1 \leq j \leq y$$

so that the dynamic range of the output matrix P is:

$$0 \leq (P = \text{integer}) \leq (N \cdot H).$$

Control signal generator 138 then transforms the matrix P based on the table values in color video look-up memory 140 to generate the control signals for display 116. The display value matrix P is then displayed through a video look-up table (with H hues, N apparent brightness levels of each hue, and zero level P=0=black) on the color display 116 of a digital image processing system, to produce a quasi-three-dimensional image of the original scene.

In the preferred embodiment, the video look-up table for range/intensity color mapping has the form of a 31-element table stored in a memory in processor 114. In that system, a Ramtek GX-100B Graphic Display System, interfaced through an Interdata minicomputer to an IBM 370/168, displays the images. The video look-up table is shown in Table II.

TABLE II

| Display Value | Color | Color Gun Intensity | | |
|---|---|---|---|---|
| | | Red | Green | Blue |
| 0 | Black | 0 | 0 | 0 |
| 1 | Darkest Red | 5 | 1 | 1 |
| 2 | | 6 | 1 | 1 |
| 3 | | 8 | 2 | 2 |
| 4 | | 10 | 3 | 3 |
| 5 | | 12 | 3 | 3 |
| 6 | Lightest Red | 15 | 6 | 6 |
| 7 | Darkest Yellow | 7 | 5 | 1 |
| 8 | | 9 | 7 | 1 |
| 9 | | 10 | 9 | 2 |
| 10 | | 10 | 12 | 4 |
| 11 | | 13 | 14 | 6 |
| 12 | Lightest Yellow | 14 | 15 | 8 |
| 13 | Darkest Green | 0 | 4 | 1 |
| 14 | | 0 | 7 | 1 |
| 15 | | 0 | 10 | 3 |
| 16 | | 0 | 13 | 5 |
| 17 | | 0 | 14 | 7 |
| 18 | Lightest Green | 3 | 15 | 9 |
| 19 | Darkest Blue | 0 | 0 | 5 |
| 20 | | 0 | 2 | 8 |
| 21 | | 0 | 4 | 10 |
| 22 | | 0 | 6 | 12 |
| 23 | | 0 | 9 | 14 |
| 24 | Lightest Blue | 0 | 11 | 15 |
| 25 | Darkest Purple | 6 | 2 | 6 |
| 26 | | 7 | 2 | 8 |
| 27 | | 9 | 3 | 11 |
| 28 | | 10 | 6 | 12 |
| 29 | | 11 | 8 | 14 |
| 30 | Lightest Purple | 13 | 10 | 15 |

The numeral value of a pixel in the matrix, P, is used as an index into the video lookup table. For example, if $P(i,j) = 5$ for any arbitrary $(i,j)$, the pre-stored color at location 5 in the video lookup table is used to display that pixel. The video lookup table used for all range/intensity color mapped imagery presented here is given in Table II. Each of five hues has been subdivided into six brightness levels. The hue, red, is used for range returns that are closest to the sensor and purple is used for objects at the far end of the range gate. Finally, noise values (i.e., $P(i,j) = 0$) are mapped into location zero which is black.

Active infrared imagery suffers from a phenomenon induced by the coherence of the illuminating laser beam combined with the reflective surface roughness at 10.6 82 m. This visually degrading effect, known as speckle, severely limits image quality. To minimize this effect, the present embodiment incorporates frame averaging, which improves the signal to noise ratio. The improvement corresponds to the square root of the number of frames averaged, where both intensity and range are averaged before applying range/intensity color mapping.

In the present embodiment, which is adapted for use with the radar system of the incorporated reference, the digital peak detector saves the peak intensity value within the pre-set range gate, regardless of whether this peak value is due to true signal or to random noise returns. If range/intensity color mapping is applied without compensating for this effect, random noise values (which occur at random noises) are mapped into random hues thereby degrading edge definition and overall clarity. The preferred embodiment described above utilizes noise filtering based o the global intensity histrogram to determine a noise threshold. The range/intensity color-mapped data provided by the present invention produces an image with a three-dimensional quality. The color contrast tends to enhance the perception of small nearby objects which are imaged against a more distant background.

Since, in colorimetric terms hue, saturation, and brightness are orthogonal characteristics of color, these display parameters may be controlled in accordance with the present invention. However, in the present embodiment, these parameters are determined by controlling the perceptual color characteristics of hue and "apparent brightness" (the latter being a combination of the color characteristics saturation and brightness) at the display. In different embodiments, various combinations of two or more of the orthogonal color characteristics may be used.

The present invention has been described above in terms of a system for generating display control signals from infrared radar range and intensity data, both of which are functions of two parameters (x,y). As described above, the display control signals may be used to control conventional color CRT display (or other form of color display) to show quasi-three dimensional images, i.e. depth information is apparent as well as x and y information. In addition, intensity information is present denoting the reflectivity of objects in the target scene.

In alternative embodiments, different display formats may be used in keeping with the present invention. For example, when used with a radar system providing range and velocity information as a function of pixel location, the display may indicate moving targets against a quasi-three dimensional background. More particularly, a target scene may be displayed, but where variation in brightness corresponds to the variation in velocity of objects at the different ranges.

In yet other embodiments, any pair of functions of two variables, f(x,y) and g(x,y) (or cascaded function of two variables, f(g(x,y)) (since such a function is equivalent to the vase of two functions of two variables)), may be similarly displayed. Such applications might include bad-weather landing systems for aircraft (including light planes) using airfields which do not have microwave landing system instrumentation, collision avoidance systems for private and commercial marine vessels, surveillance systems for property protection and crime prevention, and clear air turbulence sensors for commercial airliners. In alternate exemplary embodiments, x and y could be representative of real and imaginery parts of complex numbers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. System for generating a control signal for controlling a color display to display signals representative of a first function f(i,j) and a second function g(i,j), where i and j are independent integer variables, comprising A. g-quantizer means for grouping the values of g(i,j) into a predetermined number (N) of groups, each of said groups corresponding to a predetermined range of the values of g(i,j), each of said ranges corresponding to a first predetermined perceptual color characteristic, wherein said g-quantizer includes means for generating a g-quantized matrix g'(i,j), where $$g'(i,j) = \begin{cases} n, & \text{if } g(i,j) > T \text{ for } 1 \leq n \leq N \\ 0, & \text{otherwise} \end{cases}$$

where g'(i,j) is an integer, T equals M&K·S, where M and S are the mode and standard deviation, respectively, of the frequency of occurrence of the respective values o g(i,j) and K is a predetermined constant, and for each (i,j), n is the integer for which the cumulative distribution function of the g values exceeding T evaluated at (i,j) is between $$(n-1)\frac{M}{N} \text{ and } n\frac{M}{N},$$

where M is the maximum value of said cumulative distribution function,

B. f-quantizer means for grouping the values of f(i,j) into a predetermined number (H) of groups, each of said groups corresponding to a predetermined range of the values of f(i,j), each of said ranges corresponding to a second predetermined perceptual color characteristic, where said secnd predetermined perceptual color characteristic is substantially orthogonal to said first predetermined perceptual color characteristic, wherein said f-quantizer includes means for generating an f-quantized matrix f'(i,j), where $$f'(i,j) = \begin{cases} \text{integer part}[H(f(i,j) - f_{MIN})/(f_{MAX} - f_{MIN}) + 1], \\ \text{for } f_{MIN} \leq f(i,j) \leq f_{MAX} \\ H \quad \text{for } f(i,j) = f_{MAX} \end{cases}$$

wherein f'(i,j) is an integer, $f_{MIN}$ is the minimum value of f(i,j) and $f_{MAX}$ is the maximum value of f(i,j), and c. display map generator means operative for each point (i,j) to generate said control signal P(i,j), where $$P(i,j) = \begin{cases} 0, & \text{if } g'(i,j) = 0 \\ f'(i,j) + N[f'(i,j) - 1], & \text{otherwise} \end{cases}$$

said control signal being representative of the first and second perceptual color characteristics f'(i,j)

and g'(i,j), respectively, associated with f(x,y) and g(i,j) for that point.

2. A system according to claim 1 further comprising a means for receiving signals to be displayed f(x,y) and g(x,y) where x and y are independent variables, and
   an input matrix generator including means for converting said functions f(x,y) and g(x,y) to input matrix signals f(i,j) and g(i,j).

3. The system according to claim 1 further comprising means for receiving said values of f(i,j) and g(i,j) wherein f is a range function of the coordinates i,j of objects in a two dimensional image of a target scene, wherein the values of said range function being representative of the position of objects at said coordinates in said target scene, and
   wherein g is an intensity function of i,j, the values of said intensity function are representative of the reflectivity of objects at said coordinates in said target scene.

4. The system according to claim 1 further comprising means for receiving said values of f(i,j) and g(i,j) wherein f is a range function of the coordinates i,j of objects in a two dimensional image of a target scene, wherein the values of said range function are representative of the position of objects at said coordinates in said target scene, and
   wherein g is a velocity function of i,j, the values of said velocity function being representative of the velocity of objects at said coordinates in said target scene.

5. The system according to claim 1 further comprising means for receiving said values of f(i,j) and g(i,j) wherein f is a velocity function of the coordinates i,j of objects in a two dimensional image of a target scene, wherein the values of said velocity function being representative of the velocity of objects at said coordinates in said target scene, and
   wherein g is an intensity function of i,j, the values of said intensity function being representative of the reflectivity of objects at said coordinates in said target scene.

6. The system according to claims 1 or 3 or 4 or 5 wherein said first perceptual color characteristic is hue and said second perceptual color characteristic is apparent brightness, and wherein said control signal generating means includes means for generating said control signal whereby said control signal is adapted to control the hue and apparent brightness of said color display.

* * * * *

UNITED STATES PATENT AND TRADEMARK OFFICE
CERTIFICATE OF CORRECTION

PATENT NO. : 4,352,105
DATED : September 28, 1982
INVENTOR(S) : ROBERT C. HARNEY It is certified that error appears in the above—identified patent and that said Letters Patent is hereby corrected as shown below:

The name of the Assignee shown on the face of the patent is incorrect. The correct name of Assignee is -- MASSACHUSETTS INSTITUTE OF TECHNOLOGY, Cambridge, Mass. --.

Signed and Sealed this

Twenty-third Day of November 1982

[SEAL]

Attest:

GERALD J. MOSSINGHOFF

Attesting Officer  Commissioner of Patents and Trademarks